United States Patent
Rehn

(10) Patent No.: US 8,801,230 B2
(45) Date of Patent: Aug. 12, 2014

(54) LUMINAIRE FOR ILLUMINATING A TARGET AREA BY MEANS OF RETROREFLECTION OF LIGHT FROM A LIGHT-EMITTING DIODE MODULE ON A REFLECTOR

(75) Inventor: Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 74 days.

(21) Appl. No.: 13/574,195

(22) PCT Filed: Nov. 24, 2010

(86) PCT No.: PCT/EP2010/068088
§ 371 (c)(1),
(2), (4) Date: Jul. 19, 2012

(87) PCT Pub. No.: WO2011/088922
PCT Pub. Date: Jul. 28, 2011

(65) Prior Publication Data
US 2012/0294001 A1    Nov. 22, 2012

(30) Foreign Application Priority Data

Jan. 19, 2010 (DE) .................. 10 2010 001 007

(51) Int. Cl.
*F21V 29/00*  (2006.01)
(52) U.S. Cl.
USPC ................. 362/294; 362/373; 362/249.02
(58) Field of Classification Search
USPC ...................... 362/294, 373, 249.02
See application file for complete search history.

(56) References Cited

U.S. PATENT DOCUMENTS

| 2002/0182563 | A1 | 12/2002 | Boutoussov et al. | |
| 2004/1025250 | | 12/2004 | McCullough et al. | |
| 2007/0253733 | A1 | 11/2007 | Fey | |
| 2009/0201665 | A1* | 8/2009 | Goto | 362/97.1 |
| 2011/0305025 | A1* | 12/2011 | Loveland | 362/294 |

FOREIGN PATENT DOCUMENTS

| CN | 1550869 | 12/2004 |
| CN | 1993581 | 7/2007 |
| CN | 101078470 | 11/2007 |
| DE | 10 2005 017 751 | 10/2006 |

* cited by examiner

*Primary Examiner* — Sean Gramling
(74) *Attorney, Agent, or Firm* — Cozen O'Connor

(57) ABSTRACT

A luminaire for illuminating a target area (34) by retroreflection from a reflector (30), comprising a light-emitting diode module (12) having at least one light-emitting diode; (14) and a cooling device (10) for the light-emitting diode module (12), the cooling device including as coolant a liquid (26) that is transparent to the light of the light-emitting diode module and a transparent coolant container (20) for accommodating the coolant; (26) wherein the coolant container (20) comprises a first (22) and a second transparent wall (24) between which the coolant (26) is located and which extend substantially perpendicularly to the optical axis (36) of the reflector (30) and have a surface such that in an assembled state in which the light-emitting diode module (12) and the cooling device (10) are connected to the reflector (30), at least 90% of the radiation of the light-emitting diode module (12) which is reflected from the reflector (30) and which reaches the target area (34) passes through the coolant container (20).

10 Claims, 2 Drawing Sheets

LUMINAIRE FOR ILLUMINATING A TARGET AREA BY MEANS OF RETROREFLECTION OF LIGHT FROM A LIGHT-EMITTING DIODE MODULE ON A REFLECTOR

RELATED APPLICATIONS

This is a U.S. National Phase Application under 35 USC 371 of International Application PCT/EP2010/068088 filed on Nov. 24, 2010.

This application claims the priority of German Application No. 10 2010 001 007.3 filed Jan. 19, 2010, the entire content of which is hereby incorporated by reference.

FIELD OF THE INVENTION

The invention relates to a luminaire for illuminating a target area by means of retroreflection from a reflector, said luminaire comprising a light-emitting diode module having at least one light-emitting diode (LED), as well as a cooling device for the light-emitting diode module, the cooling device including as coolant a liquid that is transparent to the light of the light-emitting diode module and a transparent coolant container for accommodating the coolant.

BACKGROUND OF THE INVENTION

An illumination system which uses a light source of said type is known from US 2007/0253733 A1. The cited document describes the use of the illumination system for a fluorescence microscope. An LED light source is positioned at a focal point of an elliptical mirror and emits its radiation into a hemisphere facing toward the mirror. The mirror reflects the incident radiation and focuses it onto a downstream optical system. Due to the retroreflection from the reflector, i.e. reflection of beams having an angle of incidence of less than 45°, it is impossible to prevent the LED light source and the mechanical structures required for retaining it from themselves obstructing the reflected light.

Because the light yield of a LED decreases with increasing temperature it is necessary to ensure that the heat generated during its operation will be dissipated in order to minimize the heating-up of the LED during operation. If a LED module is arranged at the focal point of a backward-reflecting reflector, the module cannot be cooled by an otherwise conventional heatsink because the latter would shadow an even greater part of the light reflected from the reflector. Instead of this, the heat must be conducted to the outside by means of the retainers. Even if the latter can be implemented in a very compact design in order to keep losses of the reflected light to an absolute minimum, they take up more room than a LED on its own and consequently lead to a shadowing of the reflected light. Even if the retainers are embodied as transparent, the reflected radiation incident thereon is affected and the optical efficiency of the arrangement reduced.

SUMMARY OF THE INVENTION

One object of the present invention is to provide a luminaire of the generic type in which a high level of efficiency in terms of light transmission and heat dissipation of the LED module is made possible while at the same time aiming to minimize the generation of artifacts such as shadows.

The present invention is based on the knowledge that liquid cooling of a LED module can be designed in such a way that the light emitted by the LED and reflected by the reflector is influenced in a defined manner when it impinges on the coolant container. Toward that end the coolant container has a first and a second transparent wall between which the coolant is located and which extend substantially perpendicularly to the optical axis of the reflector and have a surface such that in an assembled state in which the LED module is coupled to the reflector virtually all, i.e. at least 90%, of the radiation of the light-emitting diode module which is reflected by the reflector and which reaches the target area passes through the coolant container.

The coolant container therefore has two walls parallel to each other and covers the entire cross-section of the radiation emanating from the light-emitting diode module and reflected by the reflector. The walls of the coolant container can be made of glass or plastic. The coolant can be water, for example, whose refractive index of 1.33 differs only slightly from that of glasses or transparent plastics having a low refractive index (approx. 1.5), or transparent oil. In the choice of the coolant and the material for the coolant container it is in any case advantageous if the refractive index of the first and the second wall and that of the coolant are so similar that the reflection losses at the interfaces between the walls and the coolant are very small. The first and the second wall of the coolant container can be rectangular, in particular square, or their outline can be matched to the outline of the reflector. It is of advantage in this case if the outer edge of the coolant container lies outside of the area into which the radiation emanating from the luminaire is reflected in order to rule out any detrimental effect on the reflected radiation. In that case it is also irrelevant whether the edge itself is transparent or not. In the ideal case all of the radiation of the light-emitting diode module which is reflected by the reflector and which reaches the target area passes through the coolant container.

Preferably the LED module is embodied such that the at least one light-emitting diode emits light at most into one hemisphere. In this way the LED module can be arranged such that all of the emitted light is incident on the reflector and is reflected by the latter in the direction of the target area, with the result that the light reaching the target area has defined characteristics.

According to a preferred embodiment of the invention the cooling device additionally serves as a retainer for the light-emitting diode module. As a result two functions are combined in one component, while shadowing caused by an additional retainer is avoided.

According to a particularly preferred embodiment of the invention the light-emitting diode module includes a thermally conducting element which is coupled to the light-emitting diode and is recessed into the coolant container such that it is in contact with the coolant. In this way the LED module is secured to the cooling device and at the same time effective dissipation of the heat being generated during operation is ensured. A particularly efficient transfer of heat from the thermally conducting element to the coolant can be achieved for example if the thermally conducting element is embodied as a solid cylinder having fins projecting outward therefrom or has holes through which the coolant flows. In addition the thermally conducting element can have a rough or structured surface.

According to another particularly preferred embodiment of the invention the light-emitting diode module includes a printed circuit board on the top side of which one or more light-emitting diodes are mounted and the bottom side of which is connected to the thermally conducting element in particular by means of a thermally conductive material, the dimension of the thermally conducting element in a direction perpendicular to the optical axis of the light-emitting diode module being less than or equal to the corresponding dimension of the printed circuit board. In this way only the shadowing at the LED module reduces the amount of light reaching the target area.

According to a further preferred embodiment of the invention the first wall of the coolant container, i.e. the wall which in the assembled state faces toward the reflector, has conductive coatings for the electrical contacting of the light-emitting diode module, which conductive coatings can be implemented as transparent.

According to another preferred embodiment of the invention the first and the second wall of the coolant container are embodied as plane-parallel plates. In this way the radiation passing through the coolant container is affected to an absolute minimum.

According to a further preferred embodiment of the invention the outside surface of the first and/or the second wall of the coolant container is embodied as curved in order to realize a specific optical function. This enables the coolant container simultaneously to assume the function of an optical element, for example a lens, as a result of which additional components and consequently costs can be saved.

Particularly preferably, a two-dimensional lens array is embodied on the outside of the first and/or the second wall of the coolant container. In particular the coolant container can have the form of a honeycomb condenser, thereby effecting a homogenization of the radiation passing through it.

BRIEF DESCRIPTION OF THE DRAWINGS

The invention shall be explained in more detail below with reference to exemplary embodiments and the accompanying figures, in which.

DETAILED DESCRIPTION OF THE DRAWINGS

Parts corresponding to one another in the figures are labeled with the same reference signs. The parts depicted and the proportions of the parts relative to one another should not be regarded as true to scale.

Figure 1:
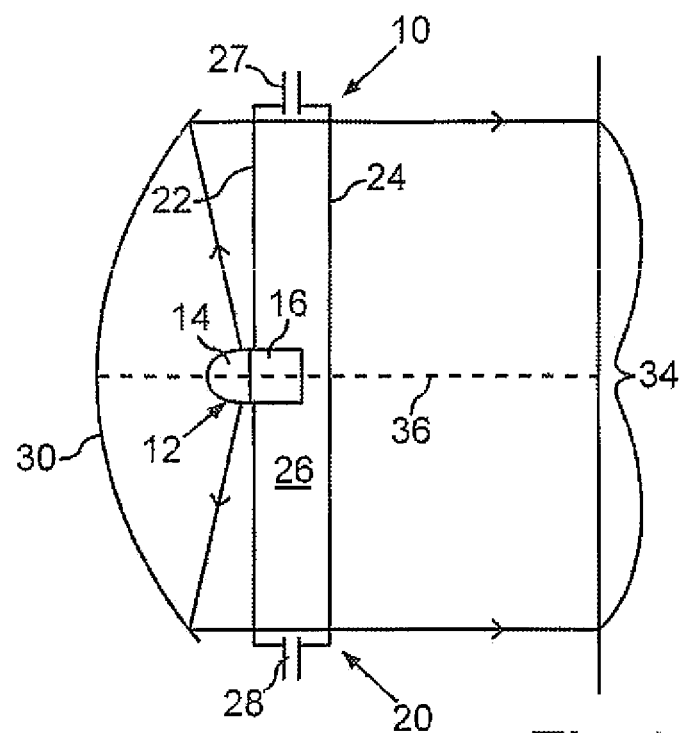
FIG. 1 shows a schematic sectional view of a first exemplary embodiment of the luminaire according to the invention.

FIG. 1 shows a first exemplary embodiment of a luminaire according to the invention. The luminaire comprises a LED module 12, which is combined with a reflector 30 in such a way that the light emitted by the LED or LEDs 14 is reflected from the reflector 30 in a backward direction, and a cooling device 10 for cooling the LED module and simultaneously serving as a retainer for the LED module 12. The LED module 12 comprises one or more LEDs 14 represented by a semicircle, and a thermally conducting element 16. A LED module 12 can also have a plurality of LEDs 14 instead of just one.

The LED or LEDs 14 is or are mounted on a printed circuit board on the bottom side of which the thermally conducting element 16 is arranged. Preferably the thermally conducting element 16 is a copper block. Its outline is matched to the shape of the printed circuit board, its size in a direction perpendicular to the optical axis of the LED module being less than or equal to the corresponding size of the printed circuit board. In this way the light loss due to shadowing is reduced to a minimum. The thermally conducting element 16 is embodied in particular as a solid cylinder and has fins or ribs projecting outward therefrom in order to enable the heat absorbed during operation to be released particularly effectively to the cooling device 10.

The cooling device comprises a flow-through coolant container 20 having a first wall 22 and a second wall 24 between which is contained a coolant 26. The thermally conducting element 16 is recessed into the coolant container 20 through a corresponding opening in the first wall 22 such that it is in contact with the coolant 26 and that the LED module 12 is anchored to the coolant container 20 thereby. For the electrical contacting of the LED module 12 there is embodied on the exterior of the first wall 22 a transparent conductive coating (not shown in the figure) which is connected to the printed circuit board of the LED module 12. Alternatively, however, the electrical contacting can also be realized by means of thin wires. As can be seen from FIG. 1, at the top and bottom edge the coolant container 20 has feed lines 27, 28 through which the coolant 26 can flow into and out of the coolant container 20. For example, the coolant 26 flows into the coolant container 20 through the top feed line 27 and out of the coolant container 20 again through the bottom feed line 28, such that coolant circulates around the thermally conducting element 16. It would, however, also be conceivable for the coolant container to be sealed after being filled with coolant, and for no active circulation of coolant to take place during operation. A transparent liquid is used as the coolant 26. This can be water, whose refractive index of 1.33 is not markedly different from the refractive index of transparent materials that are considered suitable for the walls of the coolant container 20, such as glass with a refractive index of 1.41 for example. The walls 22 and 24 of the coolant container 20 are aligned parallel to each other and perpendicular to the optical axis 36 of the LED module 12. Their surface area is greater than that of the beam of rays reflected by the reflector 30.

In order to illustrate the beam path, the two edges of the radiation emitted by the LED module 12 are depicted in FIG. 1. The walls 22 and 24 are matched rectangularly or in terms of their outline to the reflector 30. They are connected to each other at their edges by suitable means, in particular by sidewalls. Said edge regions are preferably located outside of the area of the reflected radiation in order to avoid interfering with the reflected radiation. The inside surfaces of the walls of the coolant container 20 are embodied as smooth in order to avoid any turbulence being generated in the coolant 26 at the walls as it flows through. According to the first exemplary embodiment of the invention shown in FIG. 1, the outside surfaces in particular of the first wall 22 and the second wall 24 of the coolant container 20 are also embodied as smooth, with the result that the two walls 22 and 24 are plane-parallel plates. In this way the entire coolant container 2Q acts on the incident radiation as a plane-parallel plate.

Figure 2:
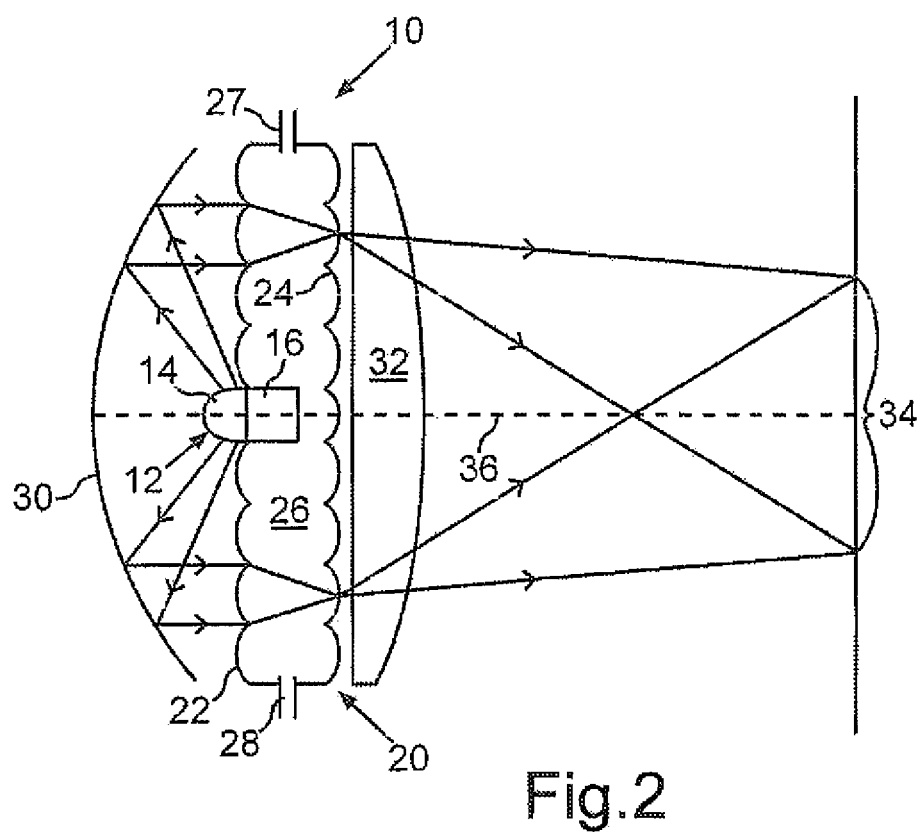
FIG. 2 shows a schematic sectional view of a second exemplary embodiment of the luminaire according to the invention.

FIG. 2 shows a second exemplary embodiment of the luminaire according to the invention. The exemplary embodiment according to FIG. 2 is characterized in that in addition to the function of cooling and retaining the LED module 12 the coolant container 20 also assumes an optical function. In other respects the cooling device 10 according to the second exemplary embodiment corresponds to the description given in connection with the first exemplary embodiment according to FIG. 1. The coolant container 20 shown in FIG. 2 is embodied as a honeycomb condenser. Toward that end lens arrays are disposed on the outside surfaces of the first wall 22 and the second wall 24 of the coolant container 20. Homogenization of the radiation passing through the coolant container 20 is effected as a result. Viewed in the propagation direction of the radiation, a Fresnel lens 32 is additionally provided after the coolant container 20 for focusing the radiation onto the target area 34. Integrating the optical function of a honeycomb condenser into the coolant container 20 enables savings to be made not only in terms of space but also in terms of material and consequently costs. Other desired optical functions can also be realized in similar fashion by suitable embodiment of the walls 22 and 24 of the coolant container 20.

In both exemplary embodiments the coolant container 20 is arranged in the luminaire in such a way that the LED module 12, whose LED or LEDs emits or emit light at most into one hemisphere, is located close to the focal point of the reflector. The reflector 30 accordingly collects all of the LED radiation and can transmit same through the coolant container. In particular conic section figures, such as paraboloids or ellipsoids, are employed as reflectors. Using a reflector in a retroreflective manner therefore results in effective exploitation of the radiation in a simple design.

The luminaire according to the invention can be designed in such a way that it can be installed in existing lamps having a reflector, such that a retrofit of prior art halogen lamp solutions is possible. Preferred applications for the solution according to the invention are medical luminaires, small-étendue applications such as projectors, or high axis light intensity applications such as headlights. It is particularly efficient and cost-effective when a large-diameter optics system is necessary.

The invention claimed is:

1. A luminaire for illuminating a target area by retroreflection from a reflector, comprising:
   a light-emitting diode module having at least one light-emitting diode; and
   a cooling device for the light-emitting diode module, the cooling device including as coolant a liquid that is transparent to the light of the light-emitting diode module and a transparent coolant container for accommodating the coolant;
   wherein the coolant container comprises a first and a second transparent wall between which the coolant is located and which extend substantially perpendicularly to the optical axis of the reflector and have a surface such that in an assembled state in which the light-emitting diode module and the cooling device are connected to the reflector, at least 90% of the radiation of the light-emitting diode module which is reflected from the reflector and which reaches the target area passes through the coolant container;
   wherein the cooling device additionally serves as a retainer for the light-emitting diode module; and
   wherein the light-emitting diode module includes a thermally conducting element which is coupled to the at least one light-emitting diode and which is recessed into the coolant container such that it is in contact with the coolant.

2. The luminaire as claimed in claim 1, wherein the first and the second wall of the coolant container have a surface such that all of the radiation of the light-emitting diode module which is reflected from the reflector and which reaches the target area passes through the coolant container.

3. The luminaire as claimed in claim 1, wherein the at least one light-emitting diode is embodied in such a way that it emits radiation at most into one hemisphere.

4. The luminaire as claimed in claim 1, wherein the thermally conducting element is embodied as a solid cylinder having fins projecting outward therefrom.

5. The luminaire as claimed in claim 1, wherein the light-emitting diode module includes a printed circuit board on the top side of which one or more light-emitting diodes are mounted and the bottom side of which is connected to the thermally conducting element, the dimension of the thermally conducting element in a direction perpendicular to the optical axis of the light-emitting diode module being less than or equal to the corresponding dimension of the printed circuit board.

6. The luminaire as claimed in claim 1, wherein the first wall of the coolant container has conductive coatings for the electrical contacting of the light-emitting diode module.

7. The luminaire as claimed in claim 1, wherein the first and the second wall of the coolant container are embodied as plane-parallel plates.

8. The luminaire as claimed in claim 1, wherein the outside surface of the first wall and/or the second wall of the coolant container is embodied as curved in order to realize an optical function.

9. The luminaire as claimed in claim 8, wherein a two-dimensional lens array is embodied on the outside surface of the first and/or the second wall of the coolant container.

10. The luminaire as claimed in claim 5, wherein the bottom side of said printed circuit board is connected to said thermally conducting element by a thermally conductive material.

* * * * *